(12) United States Patent
Hughes et al.

(10) Patent No.: US 7,706,538 B1
(45) Date of Patent: Apr. 27, 2010

(54) SYSTEM, METHOD AND DATA STORAGE DEVICE FOR ENCRYPTING DATA

(75) Inventors: James P. Hughes, Herndon, VA (US); Alexander Stewart, Louisville, CO (US); Dwayne A. Edling, Longmont, CO (US); Gregory S. Toles, Erie, CO (US); Bradley E. Whitney, Erie, CO (US); Benjamin J. Baron, Broomfield, CO (US); Howard H. Rather, Boulder, CO (US); Michael E. Foy, Louisville, CO (US)

(73) Assignee: Oracle America, Inc., Redwood Shores, CA (US)

( * ) Notice: Subject to any disclaimer, the term of this patent is extended or adjusted under 35 U.S.C. 154(b) by 906 days.

(21) Appl. No.: 11/404,692

(22) Filed: Apr. 14, 2006

(51) Int. Cl.
*H04K 1/00* (2006.01)
(52) U.S. Cl. ..................... 380/269
(58) Field of Classification Search ............... 380/269
See application file for complete search history.

(56) References Cited

U.S. PATENT DOCUMENTS 6,128,737 A  10/2000  Jakubowski et al.
7,007,166 B1 *  2/2006  Moskowitz et al. ......... 713/176
2006/0242489 A1 *  10/2006  Brockway et al. ........... 714/718
2007/0016942 A1  1/2007  Sakai et al.
2007/0078817 A1  4/2007  Girao et al.

OTHER PUBLICATIONS

Office Action for U.S. Appl. No. 11/500,047, dated Jul. 29, 2009.
Office Action for U.S. Appl. No. 11/500,047 dated Dec. 3, 2009.

* cited by examiner

*Primary Examiner*—Brandon S Hoffman
(74) *Attorney, Agent, or Firm*—Brooks Kushman P.C.

(57) ABSTRACT

A system, method and data storage device for encrypting data to provide at-rest data encryption of data in the data storage device. The system includes a compression engine for receiving a host data stream packet and selectively generating a compressed data packet, and an encryption engine in electronic communication with the compression engine for receiving an unencrypted data packet from the compression engine. The unencrypted data packet comprises the compressed data packet when the compression engine generates the compressed data packet. The unencrypted data packet comprises the host data packet when the compression engine does not generate the compressed data packet. The encryption engine generates an encrypted data packet having an encrypted component corresponding to the unencrypted data packet and a set of meta data indicative of one or more characteristic of the encrypted data packet.

20 Claims, 2 Drawing Sheets

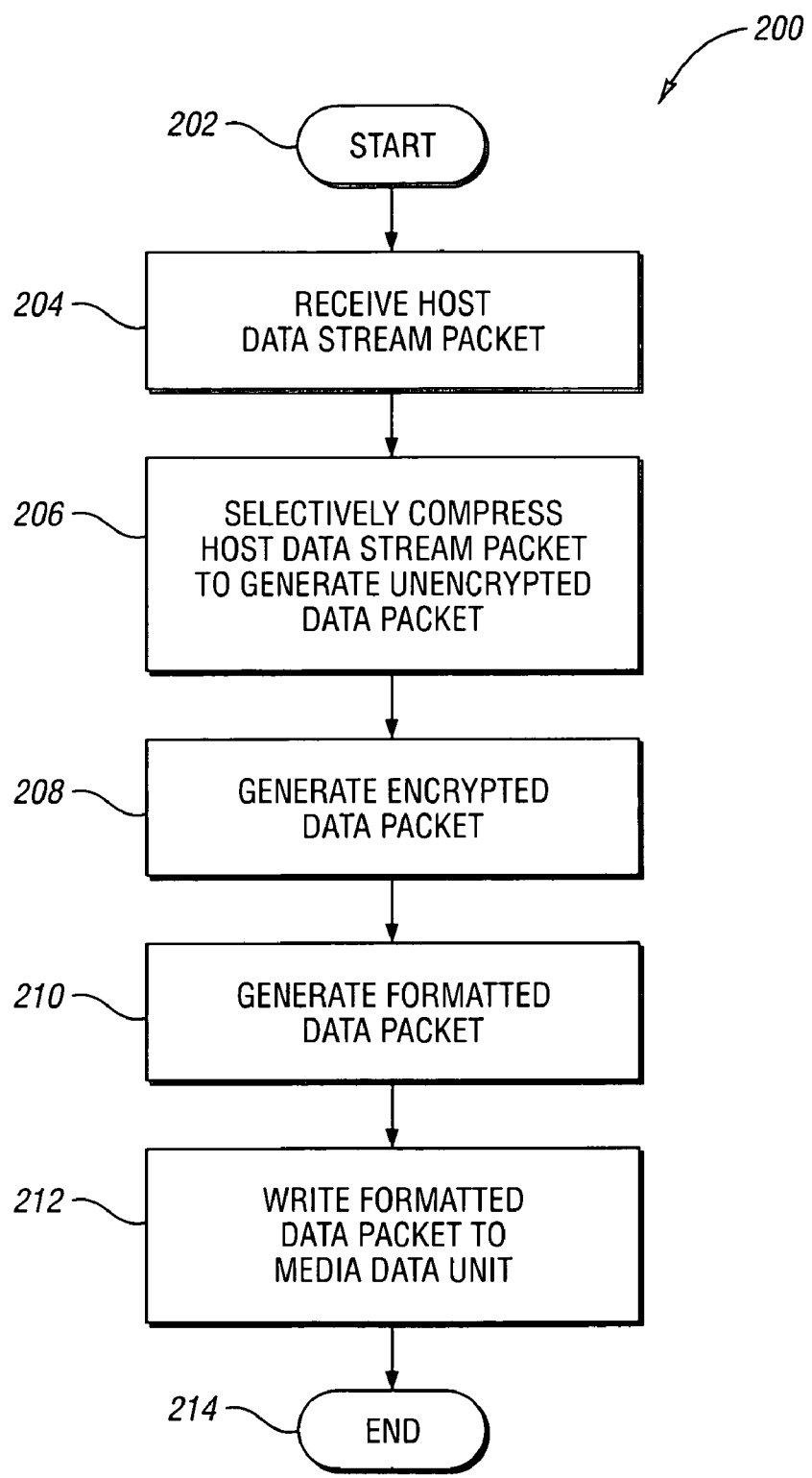

SYSTEM, METHOD AND DATA STORAGE DEVICE FOR ENCRYPTING DATA

STATEMENT REGARDING FEDERALLY SPONSORED RESEARCH OR DEVELOPMENT

The invention was made with Government support under Contract No. #2004*P125120*000. The Government has certain rights to the invention.

BACKGROUND OF THE INVENTION

1. Field of the Invention

The present invention relates generally to a system, method and data storage device for encrypting data, and in particular to a system, method and data storage device for encrypting data to provide at-rest data encryption in a data storage device.

2. Background Art

Protecting data from unauthorized access is becoming increasingly important. Both the amount and kinds of data generated requiring protection continue to increase. Moreover, attacks by those not authorized to access the data grow in frequency and sophistication. An emerging need is for the encryption of data held in storage devices, often referred to as "at-rest data encryption."

SUMMARY OF THE INVENTION

The present invention generally implements data encryption as part of the overall storage system architecture. Accordingly, the present invention may provide at-rest data encryption having full cryptographic integrity and/or which cannot be undetectably bypassed.

According to the present invention, a system for encrypting data to provide at-rest data encryption in a data storage device is provided. The system comprises a compression engine for receiving a host data stream packet and selectively generating a compressed data packet, and an encryption engine in electronic communication with the compression engine for receiving an unencrypted data packet from the compression engine. The compressed data packet comprises a compressed component corresponding to the host data stream packet and a first set of meta data indicative of one or more characteristic of the compressed data packet. The unencrypted data packet comprises the compressed data packet when the compression engine generates the compressed data packet. The unencrypted data packet comprises the host data packet when the compression engine does not generate the compressed data packet. The encryption engine generates an encrypted data packet having an encrypted component corresponding to the unencrypted data packet and a second set of meta data indicative of one or more characteristic of the encrypted data packet.

Also according to the present invention, a method for encrypting data to provide at-rest data encryption of data in a data storage device is provided. The method comprises the steps of receiving a host data stream packet at a compression engine, generating, via the compression engine, a compressed data packet, receiving the compressed data packet at an encryption engine, and generating, via the encryption engine, an encrypted data packet. The compressed data packet comprises a compressed component corresponding to the host data stream packet and a first set of meta data indicative of one or more characteristic of the compressed data packet. The encrypted data packet comprises an encrypted component corresponding to the compressed data packet and a second set of meta data indicative of one or more characteristic of the encrypted data packet.

Still further according to the present invention, a data storage device is provided. The data storage device comprises a compression engine for receiving a host data stream packet and generating a compressed data packet, an encryption engine in electronic communication with the compression engine for receiving the compressed data packet and generating an encrypted data packet, a format engine in electronic communication with the encryption engine for receiving the encrypted data packet and generating a formatted data packet satisfying a data read/write constraint of a target data media unit, and a data read/write element in electronic communication with the format engine for recording the formatted data packet on the target data media unit.

BRIEF DESCRIPTION OF THE DRAWINGS

FIG. 2 is a flow diagram of a method for encrypting data to provide at-rest data encryption of data in a data storage device according to at least one embodiment of the present invention.

DETAILED DESCRIPTION

Figure 1:
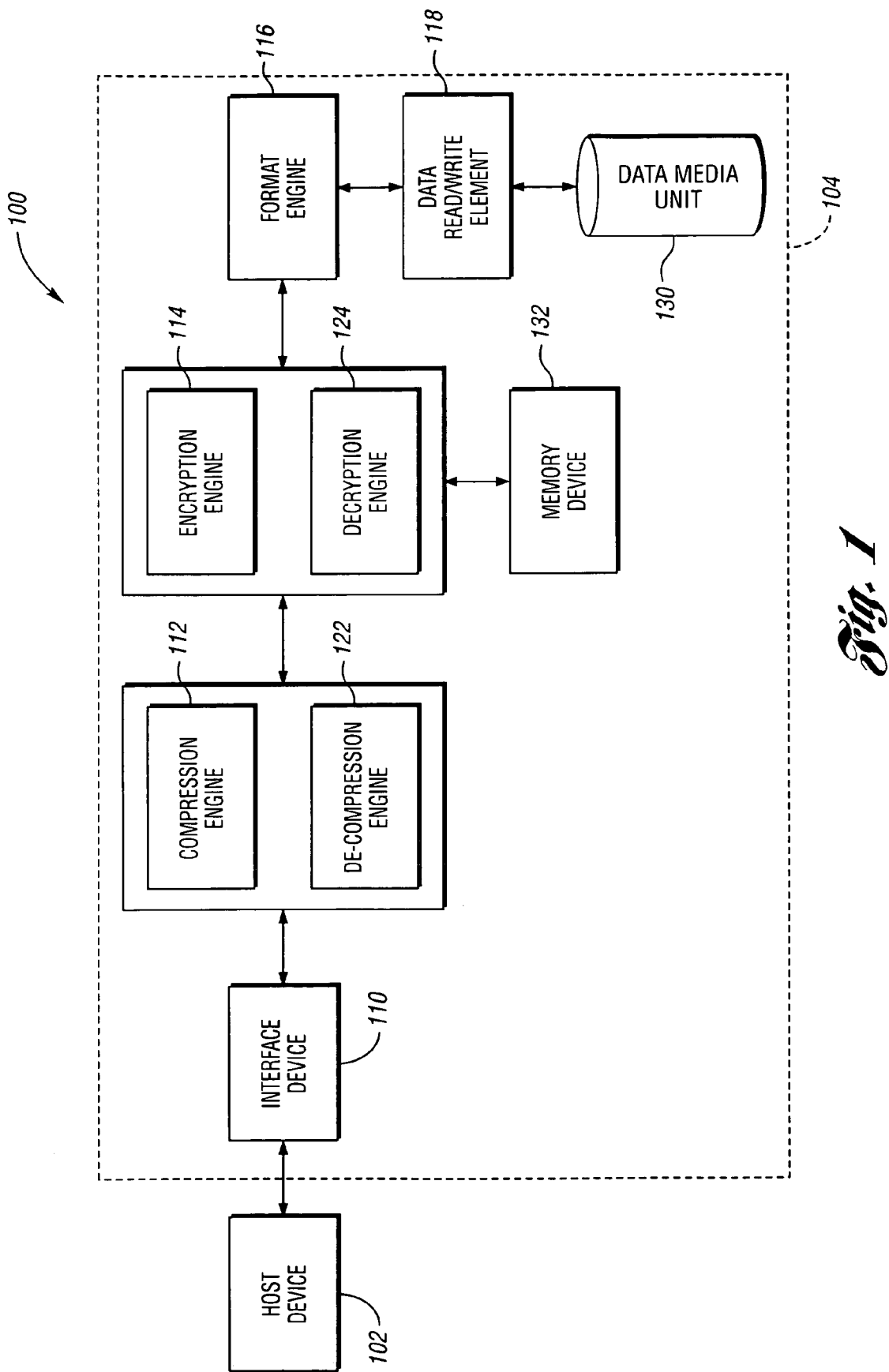
FIG. 1 is a schematic diagram of a system for encrypting data to provide at-rest data encryption of data in a data storage device according to at least one embodiment of the present invention.

Referring to FIG. 1, a schematic diagram is provided of a system 100 for encrypting data to provide at-rest data encryption of data, such as compressed data, in a data storage device according to at least one embodiment of the present invention. As illustrated, the system generally comprises a host device 102 in electronic communication with the data storage device 104 (e.g., magnetic tape drive, optical tape drive, magnetic disk drive, optical disk drive, holographic media drive, and/or the like). The data storage device 104 generally comprises an interface device 110, a compression engine 112, an encryption engine 114, a format engine 116, a data read/write element 118, a de-compression engine 122, a decryption engine 124, and/or a data media unit 130.

In general the host device 102 may be any suitable data generating and/or gathering device, such as a computer, that is electronically coupled to the data storage device 104 for transmitting and/or receiving data (i.e., host data stream) to/from, respectively, the data storage device 104.

Similarly, the interface device 110 may be any suitable device for managing communication (e.g., communication protocols, and the like) between the host device 102 and the data storage device 104. In particular, the interface device 110 may receive and/or transmit one or more signals (e.g., electronic, wireless, etc.) corresponding to data (i.e., host data stream) from/to, respectively, the host device 102. In at least one embodiment, the interface device 110 may electronically couple the host device 102 to a compression 112 and/or decompression engine 122 of the data storage device 104.

The compression engine 112 generally receives a host data stream packet (i.e., host data packet) of the host data stream from the interface device 110 and may generate (i.e., selectively generates) a compressed data packet. In general, the compression engine 112 may determine whether or not to generate the compressed data packet based on any appropriate criteria and/or trigger to meet the design criteria of a particular application. In at least one embodiment, the compression engine 112 may generate the compressed data packet using a lossless compression algorithm, such as an algorithm based on the Lemepl-Ziv family of compression algorithms, such that redundant components of the host data packet are removed (i.e., eliminated). However, any appropriate compression algorithm may be implemented to satisfy the design criteria of a particular application.

In general, the compressed data packet comprises a compressed component corresponding to the host data stream packet and a first set of meta data indicative of one or more characteristics of the compressed data packet. The first set of meta data may be generated, for example, using a buffer management device (not shown). In at least one embodiment, the first set of meta data may include one or more meta data elements corresponding to the host logical unit length, the host data stream packet type, the host logical unit address, error correction data, and/or the compression algorithm used to generate the compressed data packet. However, any appropriate information may be implemented as a member (i.e., a meta data element) of the first set of meta data to meet the design criteria of a particular application.

The encryption engine 114 is generally in electronic communication with the compression engine 112 for receiving an unencrypted data packet from the compression engine 112. The unencrypted data packet generally comprises the compressed data packet when the compression engine 112 has generated the compressed data packet from the host data packet. In the alternative, the unencrypted data packet may comprise the host data packet when the compression engine has not generate the compressed data packet. The encryption engine 114 is generally configured to generate an encrypted data packet. The encrypted data packet may comprise an encrypted component corresponding to the unencrypted data packet and a second set of meta data indicative of one or more characteristics of the encrypted data packet. As with the first set of meta data, any appropriate information may be implemented as a member (i.e., a meta data element) of the second set of meta data to meet the design criteria of a particular application.

Implementation of the present invention with conventional data storage device technology may, in at least one embodiment, be facilitated by encrypting the unencrypted data packet, including any first set of meta data, in its entirety (i.e., as a unit) using an encryption algorithm such as the CCM mode of AES-256 encryption. In such an embodiment, however, it may be desirable to preserve one or more elements of the first set of meta data in plain-text format (i.e., an unencrypted format) for subsequent use by one or more components of the system 100. In one exemplary embodiment, preservation of the one or more elements may be implemented by copying the one or more elements to a buffer memory of a memory device 132 prior to encryption of the unencrypted data packet. The one or more elements of the first set of meta data may then be included as elements, either directly or in modified form, of the second set of meta data. Accordingly, one or more elements of the second set of meta data may correspond, at least in part, to one or more elements of the first set of meta data. In addition, the one or more elements of the second set of meta data corresponding to the one or more elements of the first set of meta data may be updated to reflect the encryption operation. For example, an element of the second set of meta data corresponding to host logical unit length may be a modified form of an element of the first set of meta data, the modification reflecting a change in length as a result of the encryption operation.

In at least one embodiment, the second set of meta data may comprise one or more additional meta data elements, as compared with the meta data elements of the first set of meta data. The one or more additional meta data elements may correspond to the encryption operation and may include one or more data elements corresponding to an encryption tag (if appropriate for the encryption algorithm and/or format used,) a cyclic redundancy check field, a key identifier, and/or an initialization vector which may take the form of a nonce.

In general, the encryption tag may be a value generated as part of the encryption algorithm. Because the encryption tag value generated as part of the encryption algorithm depends on the particular composition of the encrypted component as well as the encryption header data which includes the key identifier, nonce and other data required to control the encryption process, the encryption tag may be checked as part of the decryption process to determine whether the encrypted component or any part of the encryption header information has been modified, corrupted and/or tampered with.

The cyclic redundancy check generally provides an additional level of security and verifies that all parts of the encrypted data packet, including metadata are correct.

The key identifier generally corresponds to an encryption key. Accordingly, the key identifier may provide a mechanism for recording, with the encrypted data packet, an indicator of the key used to encrypt, and therefore the key required to decrypt, the encrypted data packet while preserving the secrecy of the encryption key. In particular, the key identifier may be arbitrarily assigned to a particular encryption key such that knowledge of the key identifier, by itself, provides no further indication of the content of the encryption key.

The nonce is a particular embodiment of the initialization vector used in the encryption process and may be defined as a unique value used during encryption of a block (e.g., string, packet, etc.) of data that ensures that unique cipher-text (i.e., encrypted data) is generated without regard to the data to be encrypted and the encryption key applied. An example of a suitable nonce which may be used in one or more embodiments of the present invention is described in the commonly assigned U.S. patent application Ser. No. 11/389,835, entitled "Nonce Structure for Storage Devices," filed Mar. 27, 2006, hereby incorporated by reference in its entirety.

In general, the one or more meta data elements corresponding to the encryption tag, the cyclic redundancy check value, the key identifier and/or the nonce may be recorded in a plain-text format for subsequent use by one or more components of the system 100.

The format engine 116 may electronically couple (i.e. link via electronic communication) the encryption engine 114 with a data read and/or write (i.e., data read/write) element 118. The format engine 116 generally receives the encrypted data packet from the encryption engine 114 and generates a formatted data packet satisfying a data read/write constraint of a target data media unit 130. In at least one embodiment, the format engine 116 may associate additional meta data elements with and/or modify existing meta data elements of the encrypted data packet.

The data read/write element 118 generally receives the formatted data packet and writes the formatted data packet to the data media unit 130. The data media unit 130 may be any appropriate type of data recording media to satisfy the design criteria of a particular application, such as a magnetic tape, a magnetic disk, an optical disk, an optical tape, a holographic tape, a holographic disk, a solid state memory, and/or the like.

Retrieval (i.e., reading) of previously encrypted data recorded on a data media unit 130 is generally performed by reversing the recording (i.e., data write) steps. Accordingly, a formatted data packet may be read from the data media unit 130 via a read element of the data read/write element 118. The format engine 116 generally receives the formatted data packet from the data read/write element 118 and reconstitutes (i.e., generates) a corresponding encrypted data packet from the formatted data packet.

The decryption engine 124 is generally in electronic communication with the format engine 116 for receiving the corresponding encrypted data packet. In at least one embodiment, the meta data element of the second set of meta data corresponding to the cyclic redundancy check data and/or the encryption tag may be identified and compared with one or more values generated by the decryption engine 124, via application of the cyclic redundancy check algorithm and/or the decryption algorithm, to determine if one or more components of the corresponding encrypted data packet has been modified and/or corrupted during data storage. In addition or in the alternative, the decryption engine 124 may reconstitute (i.e., generate) a corresponding unencrypted data packet from one or more components of the corresponding encrypted data packet. In at least one embodiment, reconstituting the corresponding unencrypted data packet may include identifying the nonce and the key identifier for the corresponding encrypted data packet, as previously recorded in one or more elements of the second set of meta data. In such an embodiment, the encryption key (i.e., media key) may be identified (e.g., extracted from the memory device 132 in electronic communication with the decryption engine 124) via the key identifier and the corresponding unencrypted data packet may be reconstituted (i.e., generated) by applying the encryption key and nonce value to the corresponding encrypted data packet. The decryption engine 124 may optionally remove all elements of the second set of meta data such that the corresponding unencrypted data packet is identical or substantially similar to the unencrypted data packet prior to processing by the encryption engine 114. As illustrated in FIG. 1, the decryption engine 124 may be integrated with the encryption engine 114. However, the decryption engine 124 may be implemented as an integrated or stand alone device to meet the design criteria of a particular application.

The de-compression engine 122 is generally in electronic communication with the decryption engine 124 for receiving the corresponding unencrypted data packet. In general, the de-compression engine 122 may reconstitute (i.e., generate) a corresponding host data stream packet from the corresponding unencrypted data packet. The de-compression engine 122 may optionally remove any elements of the first set of meta data such that the corresponding host data stream packet is identical or substantially similar to the host data stream packet prior to processing, if any, by the compression engine 112. As illustrated in FIG. 1, the de-compression engine 122 may be integrated with the compression engine 112. However, the de-compression engine 122 may be implemented as an integrated or stand alone device to meet the design criteria of a particular application.

Accordingly, the interface device 110 may receive the corresponding host data stream packet from the de-compression engine 122 and transmit the corresponding host data stream packet to the host device 102.

One or more components (e.g., 110, 112, 114, 116, 122, 124, etc.) of the system 100 as described herein are optionally implemented in a data storage device 104 as firmware, software, a Field Programmable Gate Array, an Application Specific Integrated Circuit, a discrete logic module and/or other appropriate device to meet the design criteria of a particular application. Furthermore, in at least one embodiment of the present invention, one or more components may be implemented external to the data storage device 104.

Referring to FIG. 2, a flow diagram of a method 200 for encrypting data to provide at-rest data encryption in a data storage device according to at least one embodiment of the present invention is shown. The method 200 may be advantageously implemented in connection with the system 100, described previously in connection with FIG. 1, and/or any appropriate system to meet the design criteria of a particular application. Furthermore, the method 200 may be performed by any appropriate logical device associated with one or more components (e.g., 110, 112, 114, 116, 118, 122, 124, 132, etc.) of the appropriate system (e.g., 100). The method 200 generally includes a plurality of blocks or steps that may be performed serially. As will be appreciated by one of ordinary skill in the art, the order of the blocks/steps shown in FIG. 2 is exemplary and the order of one or more block/step may be modified within the spirit and scope of the present invention. However, it should be understood that a compression step (e.g., 206), if any, should be performed prior to any encryption process (e.g., 208). If the order of these two steps is reversed, the encryption process will randomize the data, thus removing any redundancy and the compression process will be ineffective. Additionally, the blocks/steps of the method 200 may be performed in at least one non-serial (or non-sequential) order, and one or more blocks/steps may be omitted to meet the design criteria of a particular application. Similarly, two or more of the blocks/steps of the method 200 may be performed in parallel. Step 202 generally represents an entry point into the method 200.

At step 204, a host data stream packet (i.e., host data packet) is generally received at a compression engine (e.g., 112). In at least one embodiment, the host data stream packet is transmitted to the compression engine via an interface device (e.g., 110) operating to electronically couple the compression engine to a host device (e.g., 102). From step 204, the method 200 generally proceeds to step 206.

At step 206, an unencrypted data packet may be generated using the compression engine. In at least one embodiment, the unencrypted data packet includes a compressed component corresponding to the host data stream packet, and a first set of meta data. Such an unencrypted data packet may also be referred to as a compressed data packet. The first set of meta data is generally indicative of one or more characteristic (e.g., host logical unit length, host data stream packet type, host logical unit address, error correction data, applied compression algorithm, etc.) of the compressed data packet and may optionally be stored in a plain-text format. In at least one other embodiment, the host data stream packet may be passed uncompressed through the compression engine such that the unencrypted data packet comprises the host data stream packet in an uncompressed state. Accordingly, step 206 may represent selective compression of the host data stream packet. In general, any appropriate criteria and/or trigger may be used to determine whether or not to compress the host data stream packet.

As previously discussed, the compression engine may, in one or more embodiment, use a lossless compression algorithm, such as an algorithm based on the Lempel-Ziv family of compression algorithms, to remove redundant components of the host data stream packet. From step 206, the method 200 generally proceeds to step 208.

At step 208, an encrypted data packet may be generated by the encryption engine from the unencrypted data packet using an encryption algorithm such as the CCM mode of AES-256 encryption (e.g., 114). In at least one embodiment the encrypted data packet may comprise an encrypted component corresponding to the unencrypted data packet, and a second set of meta data. The second set of meta data is generally indicative of one or more characteristic (e.g., applied nonce, applied key identifier, encryption tag, cyclic redundancy check field, etc.) of the encrypted data packet. Furthermore, one or more meta data elements of the second set of meta data may be stored (i.e., recorded) in a plain-text format. From step 208, the method 200 generally proceeds to step 210.

At step 210, the encrypted data packet may be formatted using a format engine to generate a formatted data packet satisfying a data read/write constraint of a target data media unit (e.g., 130) coupled to the data storage device (104). From step 210, the method 200 generally proceeds to step 212.

At step 212, the formatted data packet may be written (i.e., recorded) to the target data media unit (e.g., 130) associated with the data storage device (e.g, 104) via a data read/write element (e.g., 118). From step 212, the method 200 generally proceeds to step 214.

Step 214 generally represents an exit point out of the method 200.

It should be understood that retrieval of previously encrypted data recorded on a data media unit for subsequent transmission to a host device may be performed by reversing the steps of the method 200 and substituting a decryption engine (e.g., 124) for the encryption engine and a de-compression engine (e.g., 122) for the compression engine.

In accordance with various embodiments of the present invention, the methods described herein may be implemented as firmware, software, a Field Programmable Gate Array, an Application Specific Integrated Circuit, one or more discrete logic module of a data storage device and/or other appropriate device to meet the design criteria of a particular application. It should also be noted that a software implementation of the present invention as described herein may be optionally stored on a tangible storage medium.

Furthermore, while reference has been made to a first and second set of meta data for clarity in the preceding description, it should be understood that the elements of the first and second meta data sets may be stored and/or written as a single group of meta data.

As described above, one or more embodiments of the present invention may provide at-rest data encryption. In addition, one or more embodiments of the present invention may, when implemented in connection with a data compression technique, provide at-rest data encryption of compressed data in a data storage device.

Accordingly, one or more embodiments of the present invention may increase data security during shipment/relocation of data media units, and/or reduce the need to securely erase data media units prior to disposal and/or re-use. Similarly, one or more embodiments may provide increased efficiencies during data destruction as destruction of the corresponding encryption key may be equated to destruction of the data itself.

It is further contemplated that one or more embodiments of the present invention may increase data security during natural disasters and/or other occurrences necessitating the evacuation of a data storage center. During such an occurrence, one or more encryption keys may be removed from the system such that the data remains securely undecipherable until the occurrence has passed and the encryption key is re-installed into the system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for encrypting data to provide at-rest data encryption in a data storage device, the system comprising:
    a compression engine for receiving a host data stream packet and selectively generating a compressed data packet, the compressed data packet comprising a compressed component corresponding to the host data stream packet and a first set of meta data indicative of one or more characteristic of the compressed data packet; and
    an encryption engine in electronic communication with the compression engine for receiving an unencrypted data packet from the compression engine, wherein the unencrypted data packet comprises the compressed data packet when the compression engine generates the compressed data packet, the unencrypted data packet comprises the host data packet when the compression engine does not generate the compressed data packet, and the encryption engine generates an encrypted data packet having an encrypted component corresponding to the unencrypted data packet and a second set of meta data indicative of one or more characteristic of the encrypted data packet.

2. The system of claim 1 wherein the compression engine generates the compressed data packet using a lossless compression algorithm, wherein the lossless compression algorithm removes one or more redundant component of the host data stream packet.

3. The system of claim 1 wherein the first set of meta data includes one or more meta data element corresponding to at least one of host logical unit length, host data stream packet type, host logical unit address, error correction data, and compression algorithm used to generate the compressed data packet.

4. The system of claim 1 wherein the second set of meta data corresponds at least in part to the first set of meta data.

5. The system of claim 1 wherein the second set of meta data includes one or more meta data element corresponding to at least one of a key identifier and a nonce.

6. The system of claim 5 wherein the one or more meta data element corresponding to at least one of the key identifier and the nonce are in a plain-text format.

7. The system of claim 1 wherein the second set of meta data includes one or more meta data element corresponding to an encryption tag indicative of the encrypted component and a cyclic redundancy check value for validating the encrypted component and the second set of meta data.

8. The system of claim 1 wherein the encryption engine is implemented as a discrete logic module of the data storage device.

9. The system of claim 1 wherein the encryption engine is implemented as firmware in the data storage device.

10. The system of claim 1 wherein the encryption engine is implemented as software in the data storage device.

11. The system of claim 1 wherein the encryption engine is implemented as a Field Programmable Gate Array of the data storage device.

12. The system of claim 1 wherein the encryption engine is implemented as an Application Specific Integrated Circuit of the data storage device.

13. The system of claim 1 further comprising a format engine for receiving the encrypted data packet and generating a formatted data packet satisfying a data read/write constraint of a target data media unit coupled to the data storage device.

14. The system of claim 13 wherein the data storage device is at least one of a magnetic drive, an optical drive, and a holographic drive.

15. The system of claim 1 further comprising a decryption engine configured to:
   receive a previously encrypted data packet;
   identify a key identifier and a nonce corresponding to the previously encrypted data packet;
   extracting a media key corresponding to the key identifier from a memory device in electronic communication with the decryption engine; and
   decrypting the previously encrypted data packet using the media key and the nonce.

16. A method for encrypting data to provide at-rest data encryption of data in a data storage device, the method comprising:
   receiving a host data stream packet at a compression engine;
   generating, via the compression engine, a compressed data packet, the compressed data packet comprising a compressed component corresponding to the host data stream packet and a first set of meta data indicative of one or more characteristic of the compressed data packet; and
   receiving the compressed data packet at an encryption engine; and
   generating, via the encryption engine, an encrypted data packet, the encrypted data packet comprising an encrypted component corresponding to the compressed data packet and a second set of meta data indicative of one or more characteristic of the encrypted data packet.

17. The method of claim 16 wherein the second set of meta data includes a first meta data element corresponding to a key identifier, the second set of meta data includes a second meta data element corresponding to a nonce, and the first and second meta data elements are in a plain-text format.

18. The method of claim 16 further comprising:
   receiving the encrypted data packet at a format engine; and
   generating, using the format engine, a formatted data packet satisfying a data read/write constraint of a target data media unit coupled to the data storage device.

19. The method of claim 17 wherein the data storage device is at least one of a magnetic drive, an optical drive, and a holographic drive.

20. A data storage device comprising:
   a compression engine for receiving a host data stream packet and generating a compressed data packet;
   an encryption engine in electronic communication with the compression engine for receiving the compressed data packet and generating an encrypted data packet;
   a format engine in electronic communication with the encryption engine for receiving the encrypted data packet and generating a formatted data packet satisfying a data read/write constraint of a target data media unit; and
   a data read/write element in electronic communication with the format engine for recording the formatted data packet on the target data media unit.

\* \* \* \* \*

UNITED STATES PATENT AND TRADEMARK OFFICE
CERTIFICATE OF CORRECTION

| | | |
|---|---|---|
| PATENT NO. | : 7,706,538 B1 | Page 1 of 1 |
| APPLICATION NO. | : 11/404692 | |
| DATED | : April 27, 2010 | |
| INVENTOR(S) | : James P. Hughes et al. | |

It is certified that error appears in the above-identified patent and that said Letters Patent is hereby corrected as shown below:

In column 2, line 67, delete "Lemepl-Ziv" and insert -- Lempel-Ziv --, therefor.

Signed and Sealed this
Twelfth Day of April, 2011

David J. Kappos
*Director of the United States Patent and Trademark Office*